Feb. 4, 1941.  M. STOHR  2,230,731
ELECTRIC CONTROL SYSTEM
Filed May 27, 1940
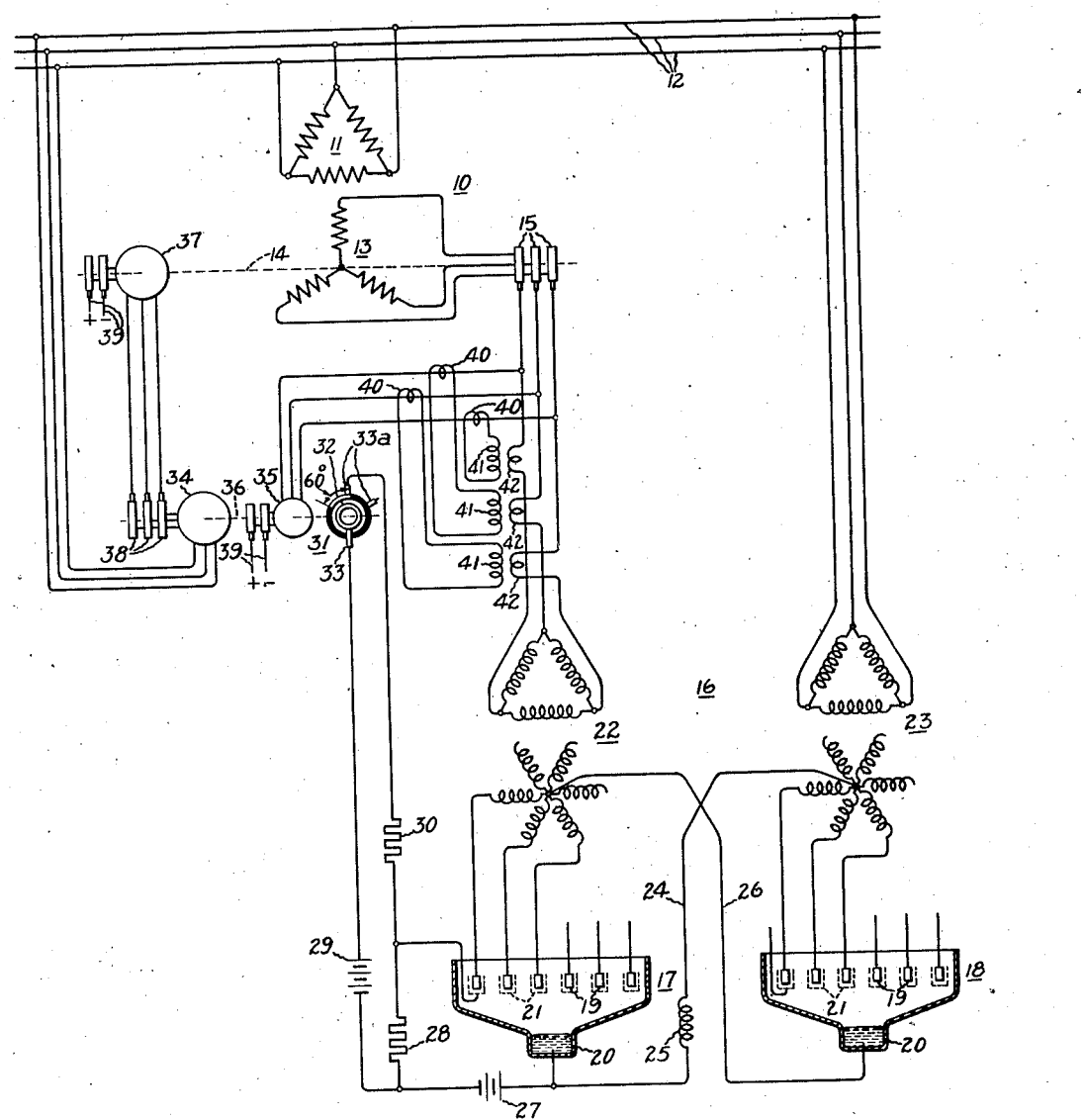
Inventor:
Max Stohr,
by Harry E. Dunham
His Attorney.

Patented Feb. 4, 1941

2,230,731

UNITED STATES PATENT OFFICE 2,230,731

ELECTRIC CONTROL SYSTEM

Max Stöhr, Berlin-Hermsdorf, Germany, assignor to General Electric Company, a corporation of New York Application May 27, 1940, Serial No. 337,533
In Germany July 15, 1939

8 Claims. (Cl. 172—274)

My invention relates to electric control systems and more particularly to electric control systems for dynamo-electric machines of the induction type.

It has been common practice to interconnect the induced, or secondary winding of an induction type machine with an electric power circuit through an electric valve converting system so that variable amounts of power may be transferred therebetween in either direction to vary an operating characteristic of the machine. If the machine is a motor it is possible in this manner to vary the speed from zero to substantially twice the synchronous speed. In the operation of such a system it is necessary to provide an excitation circuit for controlling the conductivities of at least a portion of the electric valves in accordance with the slip frequency of the machine. In some arrangements of the prior art a mechanical distributor is connected in an excitation circuit for the electric valves and driven at a speed corresponding to the slip frequency of the machine to render the valves conductive sequentially to supply energy at slip frequency to the secondary windings of the motor or to transmit energy at slip frequency from the motor windings to the power circuit at another frequency. Known arrangements for driving a control distributor at slip frequency have not been entirely satisfactory from the point of view of simplicity, cost and dependability as regards torque for driving the distributor at slip frequency throughout the entire operating range of the induction machine.

It is an object of my invention to provide a new and improved electric valve control system.

It is another object of my invention to provide a new and improved control system for electric valve translating apparatus operated with induction type dynamo-electric machines whereby reliable operation of the induction machine is insured over the full range of operating speed especially in the region near standstill and near synchronous speed.

It is a further object of my invention to provide an improved control system for electric valve translating apparatus operated with an induction type dynamo-electric machine and controlled in accordance with an operating condition of the machine whereby the excitation of the electric valves of the electric valve translating apparatus is controlled in a manner to insure optimum commutating conditions throughout the operating range of the dynamo-electric machine.

In accordance with an illustrated embodiment of my invention the primary winding of an induction motor is energized from an alternating current circuit to which the secondary winding of the induction motor is also connected through a controlled electric valve frequency changer. The electric valves, or discharge paths, of the frequency changer are rendered conductive in accordance with the slip frequency of the induction machine by an excitation circuit which includes a mechanical distributor driven at speeds corresponding to the slip frequency of the induction machine. The distributor is operated at a speed corresponding to the slip frequency of the machine by the joint action of two motors, each of which is mounted on the same shaft with the distributor and which are energized to operate at a speed corresponding to the slip frequency of the machine. One of the motors is a synchronous motor energized from the induced windings of the machine and also energized from a direct current circuit. The other motor is of the induction type and has one winding energized from the alternating current supply to which the primary winding of the main induction machine is connected, and the other winding energized from a tachometer generator driven by the induction machine and generating an electromotive force having a frequency corresponding to the speed of the induction machine. Means are also provided for varying the phase of the voltage applied to the synchronous motor in response to variations in current transmitted between the alternating current circuit and the secondary windings of the induction machine so that the distributor is automatically shifted with respect to the voltage of the secondary windings as the current transmitted to or from the secondary windings varies.

My invention, both as to its organization and operation will best be understood by reference to the following description taken in connection with the accompanying drawing, and its scope will be pointed out in the appended claims. In the drawing, the single figure is a schematic representation of one embodiment of my invention.

Referring to the drawing, a dynamo-electric machine of the induction type 10 including an inducing or primary winding 11 is connected to be energized from a polyphase alternating current circuit 12. A secondary or induced winding 13 is mounted on the rotor of the motor which is carried by a shaft shown schematically at 14. As illustrated in the drawing, the induced winding may be Y-connected and have its end terminals connected to slip-rings 15 carried by the motor shaft.

In order to control the transfer of energy to or from the induced winding 13 the slip-rings are connected to the alternating current circuit 12 through a controlled electric valve converting system illustrated generally by the numeral 16.

In the particular embodiment illustrated, the converting system includes two similar converting units 17 and 18, each of which includes an envelope containing an ionizable medium, a plurality of anodes 19, a common cathode 20 and a plurality of control members or grids 21. It will be apparent to those skilled in the art that a plurality of individual electric discharge valves comprising an anode, a cathode and a control member may be substituted for the units 17 and 18. The anodes of unit 17 are connected to the terminals of one winding of a transformer 22, the other winding of which is connected to the slip-ring 15 of the induction machine 10. In a similar manner the anodes of the converter 18 are connected to the terminals of one winding of a transformer 23, the other winding of which is connected to the alternating current circuit 12. The units 17 and 18 are interconnected by a unidirectional current circuit including a conductor 24 connecting the cathode of converter 17 to the neutral of the winding of transformer 23 with which the anodes of the unit 18 are connected through a smoothing reactor 25 and a conductor 26 connecting the cathode of converting unit 18 with the neutral terminal of the winding of transformer 22 with which the anodes of unit 17 are connected.

When the converting unit 17 operates as an inverter or a controlled rectifier it is necessary to provide a circuit for controlling the excitation of the control electrodes 21 in accordance with the slip frequency of the induction machine 10. The excitation circuit includes a distributor which is driven at a speed corresponding to slip frequency in accordance with my invention. In the drawing an excitation circuit for one of the control electrodes is illustrated as comprising a battery 27 connected to the cathode 20 of the converter 17 and to the control electrode 21 through a resistor 28 in such a manner as to impress a negative potential thereon. The control electrode is periodically rendered conductive in accordance with the slip frequency of the induced winding of the induction machine by periodically impressing a positive potential of battery 29 thereon through a current limiting resistor 30 under the control of distributor mechanism illustrated generally by the numeral 31. The distributor 31 includes a conducting segment which, in the arrangement shown, is sixty degrees in arcuate length for the six-phase connection of the converter 17. The battery 29 is electrically connected to the segment 32 in all positions of the distributor through a brush 33. The circuit from the battery to the control member 21 through the current limiting resistor 30 is completed through a brush 33a only when the brush is in contact with the conducting segment 32. While the excitation circuit has been shown for only one of the control electrodes 21, it will be apparent that by providing additional resistors 28 and 30 and brushes 33a spaced at sixty degree intervals around the circumference of the distributor 31, similar excitation circuits for the remainder of the control electrodes 21 of converter 17 may be provided. In accordance with the present invention, distributor 31 is driven by two motors 34 and 35 which are mounted on the same shaft 36 as the distributor 31. Both motors are energized to operate at slip frequency and their joint action is such as to provide a steady torque for operating the distributor for all speeds of the induction machine 10. The motor 34 is a double winding induction type motor having one winding which, as schematically illustrated may be the stator winding, is energized from the alternating current source 12, while the other winding is energized from a tachometer generator 37 mounted on the shaft of the main machine 10 through slip-rings 38. The tachometer generator is of the synchronous type and as illustrated includes a field winding energized from a direct current supply 39. The motor 35 is of the synchronous type and has its stator winding excited at slip frequency by the potential appearing between the slip rings 15 of the main induction machine 10. As illustrated, the synchronous motor 35 has a field winding excited from the direct current line 39. However, it is possible to use a synchronous motor of the type having an unexcited salient pole rotor, if desired. It is apparent from the preceding description that the motor 34 will be effective to operate the shaft 36 at slip frequency in the speed range of the motor 10 near synchronism at which time the voltage appearing across the slip-rings is very small. When the motor 10 is operating at very low speed the distributor 31 and shaft 36 will be maintained at the proper speed by the synchronous motor 35 as at that time the voltage appearing across the slip-ring 15 is large. Thus, by the conjoint action of the two motors a strong, steady torque for operating the distributor at slip frequency is provided for all operating speeds of the machine 10.

The operation of the system illustrated is as follows: As is well understood by those skilled in the art, energy is transmitted from the winding 13 to the circuit 12 when the machine 10 is operating below synchronism. Under this operating condition the converting unit 17 acts as a rectifier and the unit 18 operates as an inverter at the frequency of the line 12. The control electrodes 21 associated with the anodes of converting unit 18 are energized at the frequency of line 12 by any suitable excitation circuit (not shown). For speeds above synchronism energy is transmitted from the alternating current circuit 12 to the secondary winding 13 of the machine 10 and under these circumstances the unit 18 acts as a rectifier which may be controlled, if desired, and the unit 17 acts as an inverter for changing the direct current of unit 18 to alternating current of slip frequency. It will be understood that the brushes associated with distributor 31 must be shifted when the operation of the converting unit is changed from that of a rectifier to that of an inverter. While in the particular arrangement illustrated the units 17 and 18 have been shown as separate units interconnected by a direct current link, it is apparent that the present invention is applicable to any valve frequency changer operated with an induction machine and requiring excitation of the valves at slip frequency.

In accordance with another feature of my invention means are provided for automatically shifting the phase of the slip frequency voltage supplied to the motor 35 from the slip-rings 15 in response to an electrical condition of the translating apparatus interconnecting the alternating current circuit and the induced winding of the machine 10. As illustrated in the drawing this is accomplished by the windings 40 which are inductively related to the supply lines for the motor 35 and each of which is connected across a separate inductive winding 41. Each winding 41 is inductively related to a winding 42 connected in the conductors connecting the slip-rings 15 to a winding of the transformer 22. As shown in the drawing, the windings 40 are each associated with a different phase conductor from the one with which the corresponding winding 42 is associated so that the voltage inserted in the synchronous motor supply is shifted by an amount dependent upon the current flowing through the windings of transformer 22. In this way it is possible to automatically adjust the phase relation of the distributor 31 with respect to the voltage appearing across the slip-rings 15 as the current transmitted between the supply circuit 12 and the secondary winding 13 of the machine varies. This automatic correction varies the commutating angle of the electric valves as the load varies and insures that commutation takes place under optimum conditions.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, an alternating current circuit, a dynamo-electric machine having an inducing winding connected to be energized from said alternating current circuit and having an induced winding, an electric translating apparatus interposed between said alternating current circuit and said induced winding for controlling an operating condition of said dynamo-electric machine comprising electric valve means for transmitting energy between said alternating current circuit and said induced winding, a control circuit for controlling the conductivities of said electric valve means including a distributor mechanism, and means for operating said distributor at a speed corresponding to the slip frequency of said dynamo-electric machine comprising a pair of motors mechanically connected to said distributor and each energized to operate at slip frequency, one of said motors being energized in response to the potential of the induced winding of said machine, and the other of said motors being energized by means including a generator driven by the rotor of said dynamo-electric machine.

2. In combination, an alternating current circuit, a dynamo-electric machine of the induction type having a stator winding connected to be energized from said alternating current circuit and a rotor winding, an electric translating apparatus interconnecting said rotor winding and said alternating current circuit for controlling the speed of said dynamo-electric machine comprising electric valve means for transmitting energy between said rotor winding and said alternating current circuit, a control circuit for controlling the conductivities of said electric valve means including a distributor mechanism, and means for rotating said distributor mechanism at a speed corresponding to the slip frequency of said dynamo-electric machine comprising a pair of motors mechanically connected to said distributor and each energized to operate at slip frequency for furnishing an operating torque for said mechanism at all operating speeds of said machine, one of said motors being of the synchronous type and energized in response to the potential of the rotor winding of said machine and the other of said motors being energized by means including a generator driven by the rotor of said machine.

3. In combination, an alternating current circuit, a dynamo-electric machine having an inducing winding and an induced winding, electric translating apparatus interconnecting said alternating current circuit and said induced winding for controlling an operating condition of said dynamo-electric machine comprising a plurality of electric discharge valves for transmitting energy between said circuit and said induced winding, an excitation circuit for rendering said electric discharge valves alternately conductive and nonconductive at the slip frequency of said dynamo-electric machine, and means responsive to the current transmitted between said induced winding and said alternating current circuit by said electric valve means to vary the time in the voltage wave of said induced winding that said electric discharge valves are rendered conductive by said excitation circuit in order to vary the commutating angle of said electric discharge valves in a manner to insure commutation under optimum conditions for all operating conditions of said machine.

4. In combination, an alternating current circuit, a dynamo-electric machine having an inducing winding and an induced winding, electric translating apparatus interconnecting said alternating current circuit and said induced winding for controlling the speed of said dynamo-electric machine comprising electric valve means for transmitting energy between said circuit and said induced winding, a control circuit for controlling the conductivities of said electric valve means in accordance with the slip frequency of said machine including a distributor mechanism, means for operating said distributor mechanism at a speed corresponding to the slip frequency of said dynamo-electric machine, and means for varying the phase relation of said distributor mechanism with respect to the voltage of said induced winding as the current transmitted by said electric valve means varies in order to insure commutation under optimum conditions during variable speed operation of said machine.

5. In combination, an alternating current circuit, a dynamo-electric machine having an inducing winding connected to be energized from said alternating current circuit and having an induced winding, electric translating apparatus interposed between said alternating current circuit and said induced winding for controlling an operating condition of said dynamo-electric machine comprising electric valve means for transmitting energy between said circuit and said induced winding, a control circuit for controlling the conductivities of said electric valve means including a distributor mechanism and means for operating said distributor at a speed corresponding to the slip frequency of said dynamo-electric machine comprising a motor energized in response to the voltage of the induced winding of said machine, and means for varying the phase relation of the voltage energizing said motor with respect to the voltage appearing across said slip-rings in response to the current transmitted between said induced winding and said alternating current circuit to vary the instant at which said electric valve means are rendered conductive as the current transmitted between said induced winding and said alternating current circuit varies.

6. In combination, an alternating current circuit, a dynamo-electric machine having an inducing winding connected to be energized from said alternating current circuit and having an induced winding, an electric valve frequency changer interconnecting said induced winding and said alternating current circuit for transmitting variable amounts of energy therebetween to control an operating condition of said dynamo-electric machine, said frequency changer including a plurality of electric discharge valves each having a control electrode, a control circuit for controlling the energization of said control electrodes to control the conductivities of said electric valves including a distributor mechanism and means for rotating said distributor mechanism at a speed corresponding to the slip frequency of said dynamo-electric machine comprising a synchronous motor mechanically connected to said distributor mechanism and energized in response to the voltage of said induced winding, and means responsive to an electrical condition of the valve frequency changer interconnecting said induced winding and said alternating current circuit for varying the phase of the potential energizing said synchronous motor with respect to the voltage of said induced winding to vary the excitation of said valves in response to variations in said electrical condition.

7. In combination, an alternating current circuit, a dynamo-electric machine having an inducing winding connected to be energized from said alternating current circuit and having an induced winding, an electric translating apparatus interposed between said alternating current circuit and said induced winding for controlling the speed of operation of said dynamo-electric machine comprising electric valve means for transmitting energy between said alternating current circuit and said induced winding, a control circuit for controlling the conductivities of said valve means including a distributor mechanism, and means for operating said distributor at a speed corresponding to the slip frequency of said dynamo-electric machine comprising a pair of motors mechanically connected to said distributor and each energized to operate at slip frequency, one of said motors being of the synchronous type and energized in response to the potential of the induced winding, and the other of said motors being of the induction type and having one winding energized by a potential having a frequency corresponding to the speed of said machine by means of a generator driven by the rotor of said machine and another winding energized by a potential having the frequency of said alternating current circuit.

8. In combination, an alternating current circuit, a dynamo-electric machine having an inducing winding connected to be energized from said alternating current circuit and having an induced winding, an electric translating apparatus including an electric valve frequency changer interposed between said alternating current circuit and said induced winding for controlling the interchange of energy therebetween, a control circuit for controlling the conductivities of the electric valves of said frequency changer including a distributor mechanism, motor means for operating said distributor mechanism at a speed dependent upon the slip frequency of said machine and in definite phase relation to the potential of said induced winding, and means responsive to an electrical quantity interchanged between said alternating current circuit and said induced winding by said translating apparatus for varying the energization of said motor means to alter the phase relation of said distributor mechanism with respect to the potential of said induced winding as the electrical quantity interchanged by said translating apparatus varies.

MAX STÖHR.